(12) United States Patent
Dang et al.

(10) Patent No.: US 11,742,721 B2
(45) Date of Patent: Aug. 29, 2023

(54) ROTOR COOLING ASSEMBLY AND METHOD FOR THE INTERIOR OF A PERMANENT MAGNET MOTOR

(71) Applicant: Rivian IP Holdings, LLC, Plymouth, MI (US)

(72) Inventors: Dang Dinh Dang, Garden Grove, CA (US); Larry Xiong, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 171 days.

(21) Appl. No.: 17/235,150

(22) Filed: Apr. 20, 2021

(65) Prior Publication Data

US 2022/0337125 A1 Oct. 20, 2022

(51) Int. Cl.
*H02K 9/19* (2006.01)
*H02K 9/193* (2006.01)
*H02K 9/22* (2006.01)
*H02K 1/2793* (2022.01)
*H02K 1/28* (2006.01)
*H02K 1/276* (2022.01)

(52) U.S. Cl.
CPC ............ *H02K 9/193* (2013.01); *H02K 1/276* (2013.01); *H02K 1/2793* (2013.01); *H02K 1/28* (2013.01); *H02K 9/22* (2013.01)

(58) Field of Classification Search
CPC ...... H02K 9/193; H02K 1/276; H02K 1/2793; H02K 1/28; H02K 9/22; H02K 1/2766; H02K 9/19; H02K 1/32
See application file for complete search history.

(56) References Cited

U.S. PATENT DOCUMENTS

| | | | |
|---|---|---|---|
| 2010/0164310 A1* | 7/2010 | Dames | H02K 9/197 29/598 |
| 2014/0175916 A1* | 6/2014 | Chamberlin | H02K 1/32 310/54 |
| 2015/0015099 A1* | 1/2015 | Matsuki | H02K 9/193 310/61 |

* cited by examiner

*Primary Examiner* — Thomas Truong
(74) *Attorney, Agent, or Firm* — Clements Bernard Walker; Christopher L. Bernard

(57) ABSTRACT

A rotor assembly for a permanent magnet motor, including: a rotor shaft comprising an internal cavity having an inlet and an outlet; and a rotor core disposed about the rotor shaft, comprising an internal channel having an inlet and an outlet; wherein the outlet of the internal cavity of the rotor shaft is coupled to the inlet of the internal channel of the rotor core; and wherein the internal cavity of the rotor shaft and the internal channel of the rotor core are configured to circulate a cooling fluid through the rotor shaft and the rotor core. The rotor core includes a plurality of permanent magnets adapted to interact with a stator assembly disposed about/adjacent to the rotor core.

17 Claims, 12 Drawing Sheets

ROTOR COOLING ASSEMBLY AND METHOD FOR THE INTERIOR OF A PERMANENT MAGNET MOTOR

INTRODUCTION

The present disclosure relates generally to the automotive, manufacturing, and industrial equipment fields. More particularly, the present disclosure relates to a rotor cooling assembly and method for the interior of a permanent magnet motor.

Managing temperatures of an electric machine (EM) is critical to motor performance and reliability. In permanent magnet rotor designs, rotor core and magnet losses due to combined reluctance and magnet torques are of concern and may directly translate into undesirable heat generation. Permanent magnets exposed to increasingly high temperatures and time durations will reduce in both remanence (Br) and coercivity (Hci) performance, leading to torque output reduction and magnetization/demagnetization problems. Further, rotor geometry designs can create high thermal resistance paths to a cooling sink where heat is dissipated. As a result, magnet loss may be further impacted due to high localized temperatures.

The present background is provided by way of illustrative environmental context only. It will be readily apparent to those of ordinary skill in the art that the principles of the present disclosure may be implemented in other environmental contexts equally.

SUMMARY

The present disclosure provides a rotor cooling assembly and method by which a fluid, such as conditioned oil, from a heat exchanger fills a rotor shaft cavity, while the rotor shaft is spinning at high speeds. With the rotor shaft spinning, centrifugal force pushes the oil radially into passages disposed through the rotor shaft, each passage potentially extending from the rotor shaft cavity to an annulus end cavity. Such passages may be 180 degrees apart from other passages, 90 degrees apart, various other degrees apart, or periodic with any other suitable spacing around the rotor shaft. Via these passages, the oil fills the annulus end cavity of the rotor assembly. As the oil continuously fills the annulus end cavity, it is necessarily forced radially through provided axial rotor core channels, parallel to the source rotor shaft cavity, but in an opposite flow direction. Heat generated by rotor core loss and magnet eddy current loss is absorbed by the oil in both channels. Further, restricting outlet ports provided on an outlet end ring, opposite the annulus end ring, allows the oil to exit the rotor core channels, but restricts enough flow that a fluid film is promoted inside the various channels, further increasing heat dissipation effectiveness. The hot oil exits the outlet end ring ports and travels radially outwards to further cool the stator end windings, which are typically cooled primarily by an adjacent baffle blowing cooling oil. The utilization of centrifugal force to move the oil, filling the rotor shaft cavity with a volume of oil, and providing radial passages to direct the oil to a cavity formed between the annulus end ring and the lamination core stack surface provides superior heat dissipation in a compact arrangement. As the oil flows through the various channels, heat generated from rotor losses is absorbed and circulated out of the system, actively cooling the rotor assembly during operation.

In one illustrative embodiment, the present disclosure provides a rotor assembly for a permanent magnet motor, including: a cylindrical rotor shaft defining a rotor shaft cavity and/or an internal channel disposed along a rotor axis and having an inlet and an outlet; and a cylindrical rotor core disposed concentrically about the cylindrical rotor shaft, defining an internal channel disposed parallel to the rotor axis and having an inlet and an outlet; wherein the outlet of the internal cavity of the cylindrical rotor shaft is coupled to the inlet of the internal channel of the cylindrical rotor core; and wherein the internal cavity of the cylindrical rotor shaft and the internal channel of the cylindrical rotor core are collectively adapted to circulate a cooling fluid through the cylindrical rotor shaft and the cylindrical rotor core in series. The outlet of the internal cavity of the cylindrical rotor shaft is coupled to the inlet of the internal channel of the cylindrical rotor core via a fluid flow passage formed through a wall of the cylindrical rotor shaft, and wherein centrifugal forces from the cylindrical motor shaft and the cylindrical rotor core move the cooling fluid through the fluid flow passage to the internal channel of the cylindrical rotor core. The outlet of the internal cavity of the cylindrical rotor shaft is also coupled to the inlet of the internal channel of the cylindrical rotor core via an annulus end cavity formed by an annulus end ring coupled to a second end of the cylindrical rotor core about and/or adjacent to the cylindrical rotor shaft. The outlet of the internal channel of the cylindrical rotor core is formed through an outlet end ring coupled to a first end of the cylindrical rotor core about and/or adjacent to the cylindrical rotor shaft. The outlet of the internal channel of the cylindrical rotor core is coupled to the inlet of the internal cavity of the cylindrical rotor shaft through an intervening pump, heat exchanger, and filter. The cylindrical rotor core includes a plurality of concentrically arranged permanent magnets adapted to interact with a stator disposed concentrically about the cylindrical rotor core. The cooling fluid includes oil.

In another illustrative embodiment, the present disclosure provides a permanent magnet motor, possibly an internal permanent magnet synchronous reluctance motor, of a vehicle, including: a rotor assembly including a cylindrical rotor shaft defining an internal cavity disposed along a rotor axis (e.g., a height axis of the rotor that passes through the center of the rotor) and having an inlet and an outlet; and a cylindrical rotor core disposed concentrically about the cylindrical rotor shaft, defining an internal channel disposed parallel to the rotor axis and having an inlet and an outlet; wherein the outlet of the internal cavity of the cylindrical rotor shaft is coupled to the inlet of the internal channel of the cylindrical rotor core; and wherein the internal cavity of the cylindrical rotor shaft and the internal channel of the cylindrical rotor core are collectively adapted to circulate a cooling fluid, such as conditioned oil, through the cylindrical rotor shaft and the cylindrical rotor core in series; and a stator assembly disposed concentrically about the rotor assembly. The outlet of the internal cavity of the cylindrical rotor shaft is coupled to the inlet of the internal channel of the cylindrical rotor core via a fluid flow passage formed through a wall of the cylindrical rotor shaft. The outlet of the internal cavity of the cylindrical rotor shaft is also coupled to the inlet of the internal channel of the cylindrical rotor core via an annulus end cavity formed by an annulus end ring coupled to a second end of the cylindrical rotor core about the cylindrical rotor shaft. The outlet of the internal channel of the cylindrical rotor core is formed through an outlet end ring coupled to a first end of the cylindrical rotor core about the cylindrical rotor shaft. The outlet of the internal channel of the cylindrical rotor core is coupled to the inlet of the internal cavity of the cylindrical rotor shaft through an intervening pump, heat exchanger, and filter. The cylindrical rotor core includes a plurality of concentrically arranged permanent magnets adapted to interact with the stator assembly. The cooling fluid includes oil.

In a further illustrative embodiment, the present disclosure provides a method for cooling an interior of a rotor assembly for a permanent magnet motor, including: circulating a cooling fluid, such as conditioned oil, through a cylindrical rotor shaft defining an internal cavity disposed along a rotor axis and having an inlet and an outlet; and circulating the cooling fluid through a cylindrical rotor core disposed concentrically about the cylindrical rotor shaft, comprising and/or defining an internal channel disposed parallel to the rotor axis and having an inlet and an outlet; wherein the outlet of the internal cavity of the cylindrical rotor shaft is coupled to the inlet of the internal channel of the cylindrical rotor core; and wherein the internal cavity of the cylindrical rotor shaft and the internal channel of the cylindrical rotor core are collectively adapted or configured to circulate the cooling fluid through the cylindrical rotor shaft and the cylindrical rotor core in series. The outlet of the internal cavity of the cylindrical rotor shaft is coupled to the inlet of the internal channel of the cylindrical rotor core via a fluid flow passage formed through a wall of the cylindrical rotor shaft. The outlet of the internal cavity of the cylindrical rotor shaft is also coupled to the inlet of the internal channel of the cylindrical rotor core via an annulus end cavity formed by an annulus end ring coupled to a second end of the cylindrical rotor core about the cylindrical rotor shaft. The outlet of the internal channel of the cylindrical rotor core is formed through an outlet end ring coupled to a first end of the cylindrical rotor core about the cylindrical rotor shaft. The outlet of the internal channel of the cylindrical rotor core is coupled to the inlet of the internal cavity of the cylindrical rotor shaft through an intervening pump, heat exchanger, and filter and the method further includes removing heat from the cooling fluid using the heat exchanger. The cylindrical rotor core includes a plurality of concentrically arranged permanent magnets adapted to interact with a stator disposed concentrically about the cylindrical rotor core.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF ILLUSTRATIVE EMBODIMENTS

The present disclosure provides a rotor cooling assembly and method by which conditioned oil from a heat exchanger fills a rotor shaft cavity, while the rotor shaft is spinning at high speeds. With the rotor shaft spinning, the rotor shaft creates a centrifugal force that pushes the oil radially into one or more passages disposed through the rotor shaft, where each passage extends from the rotor shaft cavity to an annulus end cavity. Such passages may be 180 degrees apart from other passages in the rotor shaft. Further, passages may be 90 degrees apart, various other degrees apart (e.g., 45 degrees), or periodic with any other suitable spacing around the rotor shaft. Via these passages, the oil fills the annulus end cavity of the rotor assembly. As the oil continuously fills the annulus end cavity, it is necessarily forced through provided axial rotor core channels, parallel to the source rotor shaft cavity, but in an opposite flow direction from the direction conditioned oil fills the rotor shaft cavity. Heat generated by rotor core loss and magnet eddy current loss is absorbed by the oil in both channels. Further, restricting outlet ports provided on the outlet end ring, opposite the annulus end ring, allow the oil to exit the rotor core channels, but restrict enough flow that a fluid film is promoted inside the various channels, further increasing heat dissipation effectiveness. The hot oil exits the outlet end ring ports and travels radially outwards to further cool the stator end windings, which are typically cooled primarily by an adjacent baffle blowing cooling oil. The utilization of centrifugal force to move the oil, filling the rotor shaft cavity with a volume of oil, and providing radial passages to direct the oil to a cavity formed between the annulus end ring and the lamination core stack surface provides superior heat dissipation in a compact arrangement. As the oil flows through the various channels, heat generated from rotor losses is absorbed and circulated out of the system, actively cooling the rotor assembly during operation.

In a general sense, heat extraction from the rotor magnets and lamination core directly impacts machine performance, increasing continuous power and torque output. Such heat extraction allows the motor to spin faster, enabling a wide revolutions-per-minute (RPM) operating range. The reliability of the EM is increased significantly. Keeping the rotor assembly cooler results in higher power output and longer duration at peak torque, without the system degrading due to thermal limitations. This is advantageous in both automotive (e.g., electric vehicles), manufacturing, and other applications.

Figure 1:
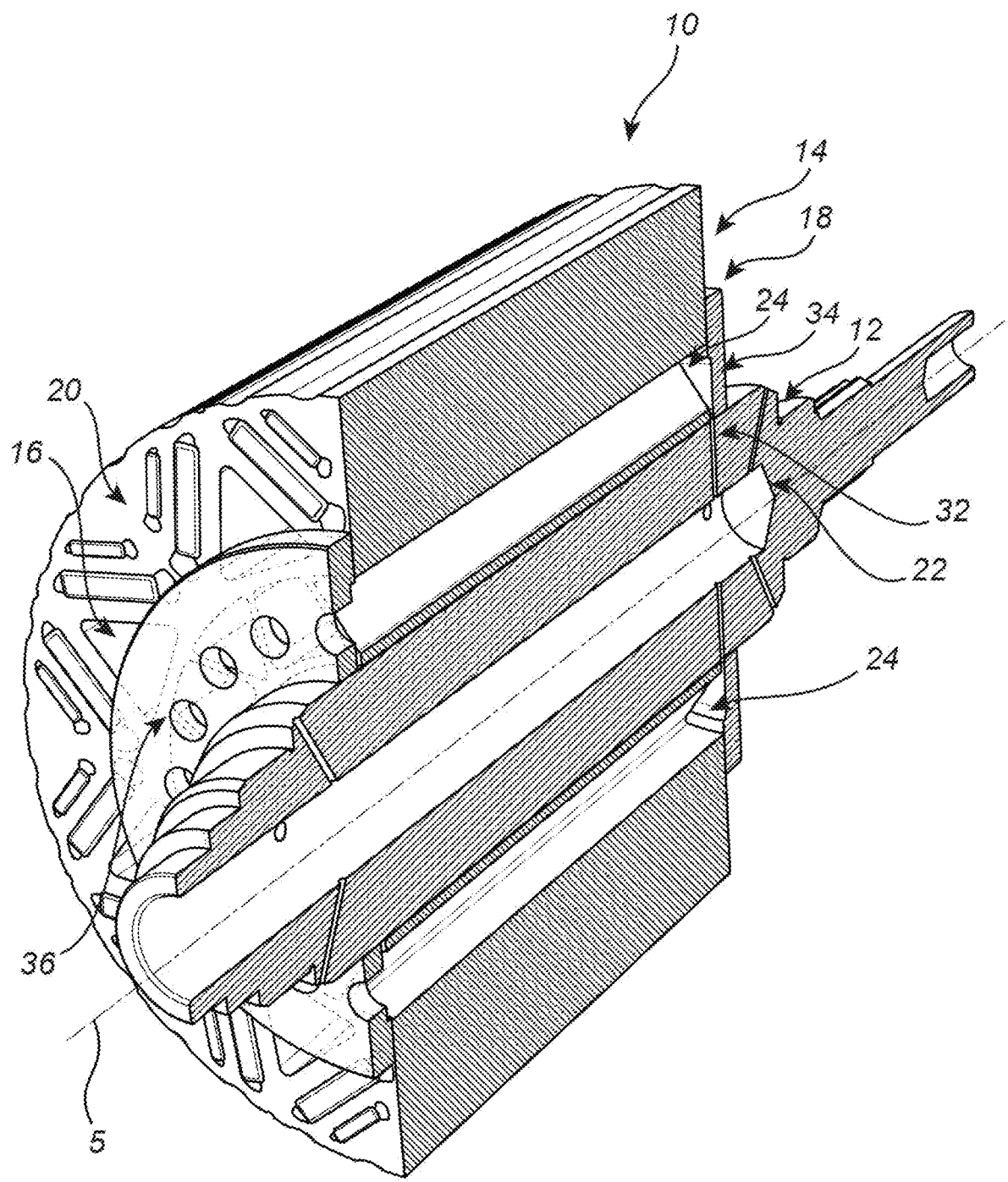
FIG. 1 is a cut-away perspective view of one illustrative embodiment of the rotor assembly of the present disclosure, highlighting the associated outlet end ring and interconnected cooling fluid cavity/channels of the associated rotor shaft and rotor core.

Referring now specifically to FIG. 1, in one illustrative embodiment, the rotor assembly 10 of the present disclosure generally includes a cylindrical rotor shaft 12 concentrically surrounded by a cylindrical rotor core 14. As used here, "cylindrical" and "annular" may refer to structures having a generally circular internal cross-sectional shape, and a likely a roughly circular external cross-sectional shape, although this external cross-sectional shape may vary to some degree, having flat or irregular regions. The rotor shaft 12 and rotor core 14 are configured to rotate concentrically about a common rotor assembly axis 5 (e.g., a height axis of the rotor shaft 5) in unison, potentially at high RPM. The rotor shaft 12 and rotor core 14 are typically both manufactured from steel. The rotor core 14 is capped at a first end by an outlet end ring 16 and at a second end by an annulus end ring 16, both of which consist of annular structures that abut the rotor core 14 but surround the rotor shaft 12.

The rotor core 14 includes a plurality of concentrically (and otherwise) arranged permanent magnets 20 that rotate with the rotor core 14, thereby interacting with the adjacent stator 21 (see FIG. 5), as in a variety of such EMs. These magnets 20 may have varying forms and sizes, such as solid magnets, segmented magnets, and other separated magnets to reduce eddy currents, thereby preventing overheating and demagnetization. Copper end windings (not illustrated) or the like may also be provided.

Per the present disclosure, the rotor shaft 12 defines an internal cavity 22 that runs at least the length or height of the rotor core 14 along the rotor assembly axis 5. The rotor core 14 also defines an internal channel 24 that runs the length of the rotor core 14, parallel to the internal cavity 22 of the rotor shaft 12, but disposed radially outwards of the internal cavity 22 of the rotor shaft 12 and the rotor assembly axis 5. Each of these internal cavity/channels 22, 24 is configured to transport a cooling fluid flow, such as an oil flow, through the corresponding component 12, 14. As illustrated, the internal cavity 22 of the rotor shaft 12 is a cylindrical cavity, while the internal channel 24 of the rotor core 14 is a prismatic channel, although any suitable cross-sectional shapes may be utilized, provided that each of the cavity/channels 22, 24 is elongated and substantially traverses the length of the rotor core 14. It should be noted that the internal channel 24 of the rotor core 14 may be any desired radial distance from the rotor assembly axis 5 and the internal cavity 22 of the rotor shaft 12, however the internal channel 24 of the rotor core 14 is generally disposed inside of and/or adjacent to the magnets 20 of the rotor core 14. It should also be noted that, although a singular rotor core internal channel 24 is typically described herein for simplicity, multiple concentrically arranged such rotor core internal channels 24 are preferably utilized and balanced around the periphery of the rotor core 14, all coupled to a single, central rotor shaft internal cavity 22.

In terms of flow direction, the cooling fluid is delivered from a heat exchanger 26 (see FIG. 5), pump 28 (see FIG. 5), and optional filter 30 (see FIG. 5) external to the rotor assembly 10, to the internal cavity 22 of the rotor shaft 12 and internal channel 24 of the rotor core 14 in series. The cooling fluid flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18, and then flows into an inlet end of the internal channel 24 of the rotor core 14 at the second end of the rotor assembly 10 including the annulus end ring 18 and flows parallel to the rotor assembly axis 5 to an outlet end of the internal channel 24 of the rotor core 14 at the first end of the rotor assembly 10 including the outlet end ring 16, before being returned to the heat exchanger 26, pump 28, and filter 30. The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14.

The cooling fluid is transported by centrifugal force, as the rotor assembly 10 spins, from the outlet end of the internal cavity 22 of the rotor shaft 12 to the inlet end of the internal channel 24 of the rotor core 14 by a plurality of radially-oriented passages 32 formed through the wall of the rotor shaft 12, as well as an annulus cavity 34 disposed between the annulus end ring 18 and the second end of the rotor core 14, and specifically the laminate stack of the rotor core 14. This cavity 34 may be formed by a recess manufactured into one or both of the annulus end ring 18 and the second end of the rotor core 14. Thus, a cooling fluid flow path is provided through the internal cavity 22 of the rotor shaft 12, the passages 32, the annulus cavity 34, and the internal channels 24 of the rotor core 14, with the use of both the passages 32 and the cavity 34 being optional. For example, the passages 32 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 34. The passages 32 and the cavity 34 provide a centrifugal force flow path for the cooling fluid as the rotor assembly 10 is spun, in part providing further motive force for forcing the cooling fluid through the rotor shaft 12 and rotor core 14.

The outlet end ring 16 includes a plurality of outlet ports 36 corresponding to the plurality of rotor core internal channels 24 that may or may not serve to partially constrict the cooling fluid flow out of the plurality of rotor core internal channels 24. In the event that such constriction is provided, the cooling fluid is encouraged to coat the surfaces of the plurality of rotor core internal channels 24 and the surface of the rotor shaft internal channel, thereby enhancing cooling capabilities. Once leaving the rotor core internal channels 24, the cooling fluid travels radially outwards to potentially cool the copper end windings or other structures mentioned above and ultimately be returned to the heat exchanger 26, pump 28, and filter 30, before the circuit is repeated after the collected heat has been expelled external to the rotor assembly 10.

Figure 2:
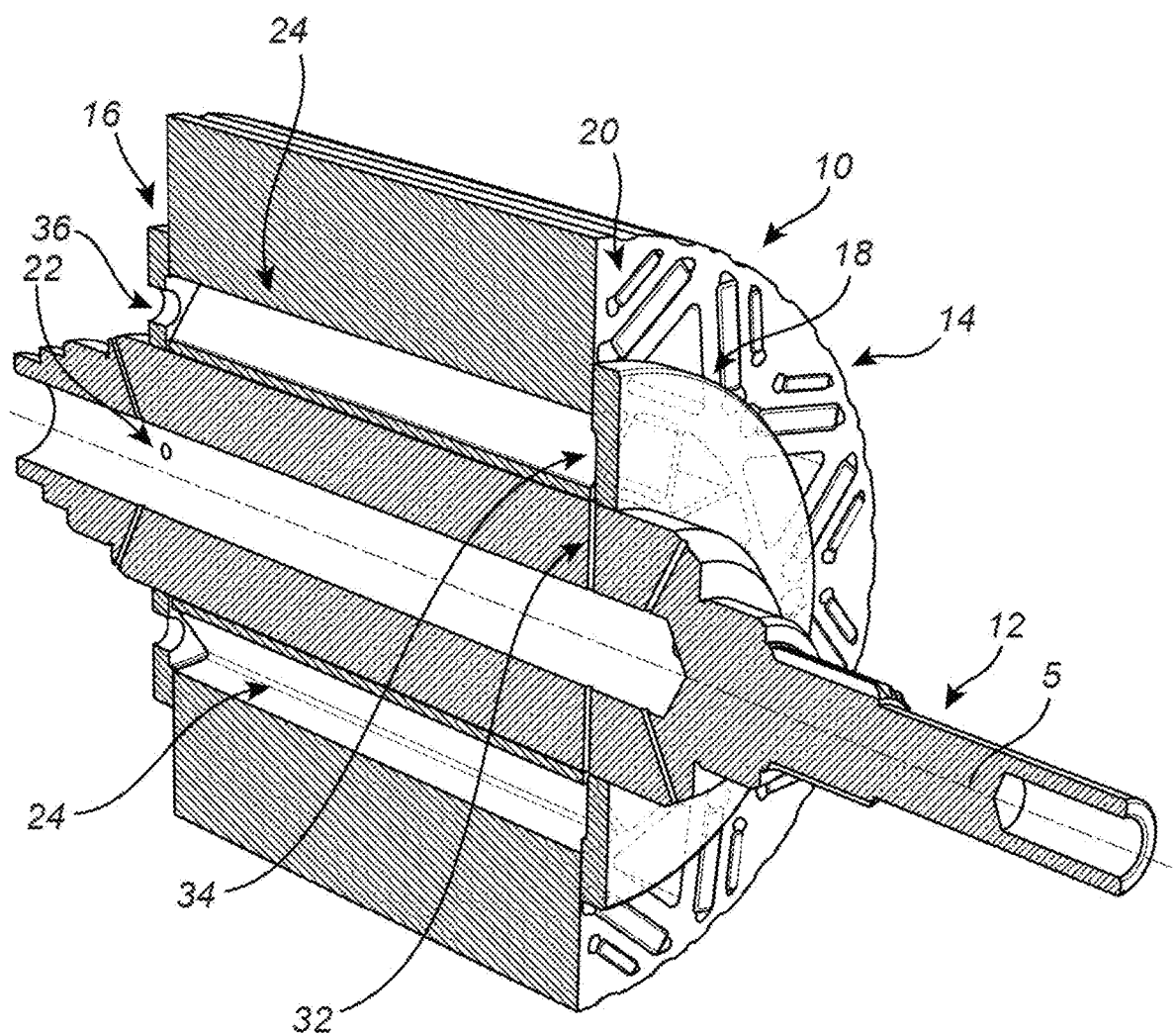
FIG. 2 is another cut-away perspective view of one illustrative embodiment of the rotor assembly of the present disclosure, highlighting the associated annulus end ring and interconnected cooling fluid cavity/channels of the associated rotor shaft and rotor core.

Referring now specifically to FIG. 2, in one illustrative embodiment, the rotor assembly 10 of the present disclosure generally includes a cylindrical rotor shaft 12 concentrically surrounded by a cylindrical rotor core 14. The rotor shaft 12 and rotor core 14 are configured to rotate concentrically about a common rotor assembly axis 5 in unison, potentially at high RPM. The rotor shaft 12 and rotor core 14 are typically both manufactured from steel. The rotor core 14 is capped at a first end by an outlet end ring 16 and at a second end by an annulus end ring 16, both of which consist of annular structures that abut the rotor core 14 but surround the rotor shaft 12.

Again, the rotor core 14 includes a plurality of concentrically (and otherwise) arranged permanent magnets 20 that rotate with the rotor core 14, thereby interacting with the adjacent stator 21 (see FIG. 5), as in such EMs discussed herein. These magnets 20 may have varying sizes. Copper end windings (not illustrated) or the like may also be provided.

The rotor shaft 12 defines an internal cavity 22 that runs at least a portion of the rotor core 14 and/or substantially the length of the rotor core 14 along the rotor assembly axis 5. The rotor core 14 also defines an internal channel 24 that runs the length of the rotor core 14, parallel to the internal cavity 22 of the rotor shaft 12, but disposed radially outwards of the internal cavity 22 of the rotor shaft 12 and the rotor assembly axis 5. Each of these internal cavity/channels 22, 24 is configured to transport a cooling fluid flow, such as an oil flow, through the corresponding component 12, 14. As illustrated, the internal cavity 22 of the rotor shaft 12 is a cylindrical cavity, while the internal channel 24 of the rotor core 14 is a prismatic channel, although any suitable cross-sectional shapes may be utilized, provided that each of the cavity/channels 22, 24 is elongated and substantially traverses the length of the rotor core 14. It should be noted that the internal channel 24 of the rotor core 14 may be any desired radial distance from the rotor assembly axis 5 and the internal cavity 22 of the rotor shaft 12, however the internal channel 24 of the rotor core 14 is generally disposed inside of and/or adjacent to the magnets 20 of the rotor core 14. It should also be noted that, although a singular rotor core internal channel 24 is typically described herein for simplicity, multiple concentrically arranged such rotor core internal channels 24 are preferably utilized and balanced around the periphery of the rotor core 14, all coupled to a single, central rotor shaft internal cavity 22.

In terms of flow direction, the cooling fluid is delivered from a heat exchanger 26 (see FIG. 5), pump 28 (see FIG. 5), and optional filter 30 (see FIG. 5) external to the rotor assembly 10, to the internal cavity 22 of the rotor shaft 12 and internal channel 24 of the rotor core 14 in series. The cooling fluid flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18, and then flows into an inlet end of the internal channel 24 of the rotor core 14 at the second end of the rotor assembly 10 including the annulus end ring 18 and flows parallel to the rotor assembly axis 5 to an outlet end of the internal channel 24 of the rotor core 14 at the first end of the rotor assembly 10 including the outlet end ring 16, before being returned to the heat exchanger 26, pump 28, and filter 30. The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14.

The cooling fluid is transported by centrifugal force, as the rotor assembly 10 spins, from the outlet end of the internal cavity 22 of the rotor shaft 12 to the inlet end of the internal channel 24 of the rotor core 14 by a plurality of radially-oriented passages 32 formed through the wall of the rotor shaft 12, as well as an annulus cavity 34 disposed between the annulus end ring 18 and the second end of the rotor core 14, and specifically the laminate stack of the rotor core 14. This annulus cavity 34 may be formed by a recess manufactured into one or both of the annulus end ring 18 and the second end of the rotor core 14. Thus, a cooling fluid flow path is provided through the internal cavity 22 of the rotor shaft 12, the passages 32, the annulus cavity 34, and the internal channels 24 of the rotor core 14, with the use of both the passages 32 and the cavity 34 being optional. For example, the passages 32 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 34. The passages 32 and the cavity 34 provide a centrifugal force flow path for the cooling fluid as the rotor assembly 10 is spun, in part providing further motive force for forcing the cooling fluid through the rotor shaft 12 and rotor core 14.

Again, the outlet end ring 16 includes a plurality of outlet ports 36 corresponding to the plurality of rotor core internal channels 24 that may or may not serve to partially constrict the cooling fluid flow out of the plurality of rotor core internal channels 24. In the event that such constriction is provided, the cooling fluid is encouraged to coat the surfaces of the plurality of rotor core internal channels 24 and the surface of the rotor shaft internal channel, thereby enhancing cooling capabilities. Once leaving the rotor core internal channels 24, the cooling fluid travels radially outwards to potentially cool the copper end windings or other structures mentioned above and ultimately be returned to the heat exchanger 26, pump 28, and filter 30, before the circuit is repeated after the collected heat has been expelled external to the rotor assembly 10.

Figure 3:
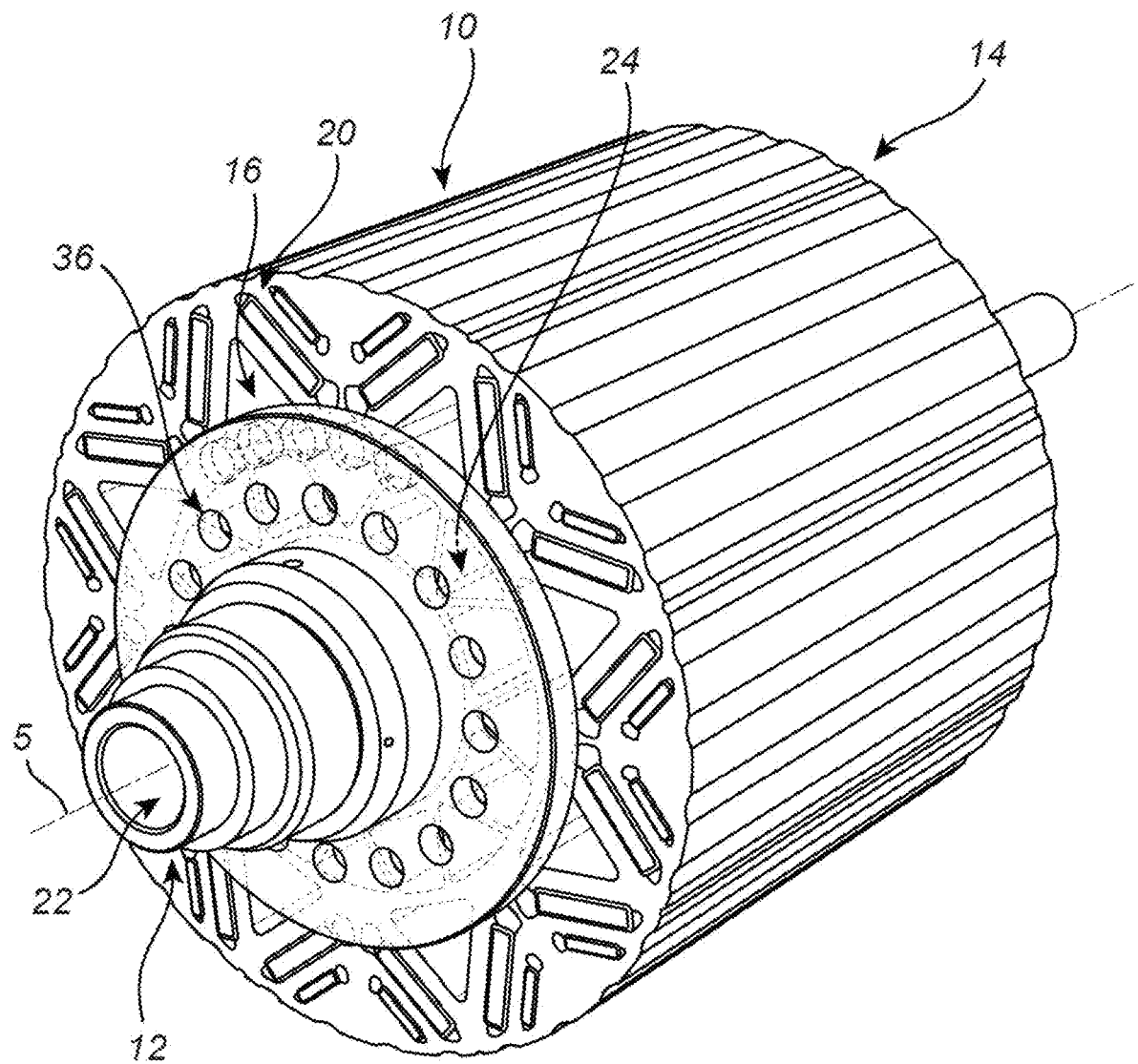
FIG. 3 is a perspective view of one illustrative embodiment of the rotor assembly of the present disclosure, highlighting the associated outlet end ring and rotor shaft and rotor core.

FIG. 3 is a perspective view of the rotor assembly 10 of the present disclosure, highlighting the first end, including the associated outlet end ring 16, rotor shaft 12, and rotor core 14, as described in detail herein above and below. In addition, FIG. 3 includes the rotor assembly axis 5, the magnets 20, the cavity 22, the channels 24, and the outlet ports 36.

Figure 4:
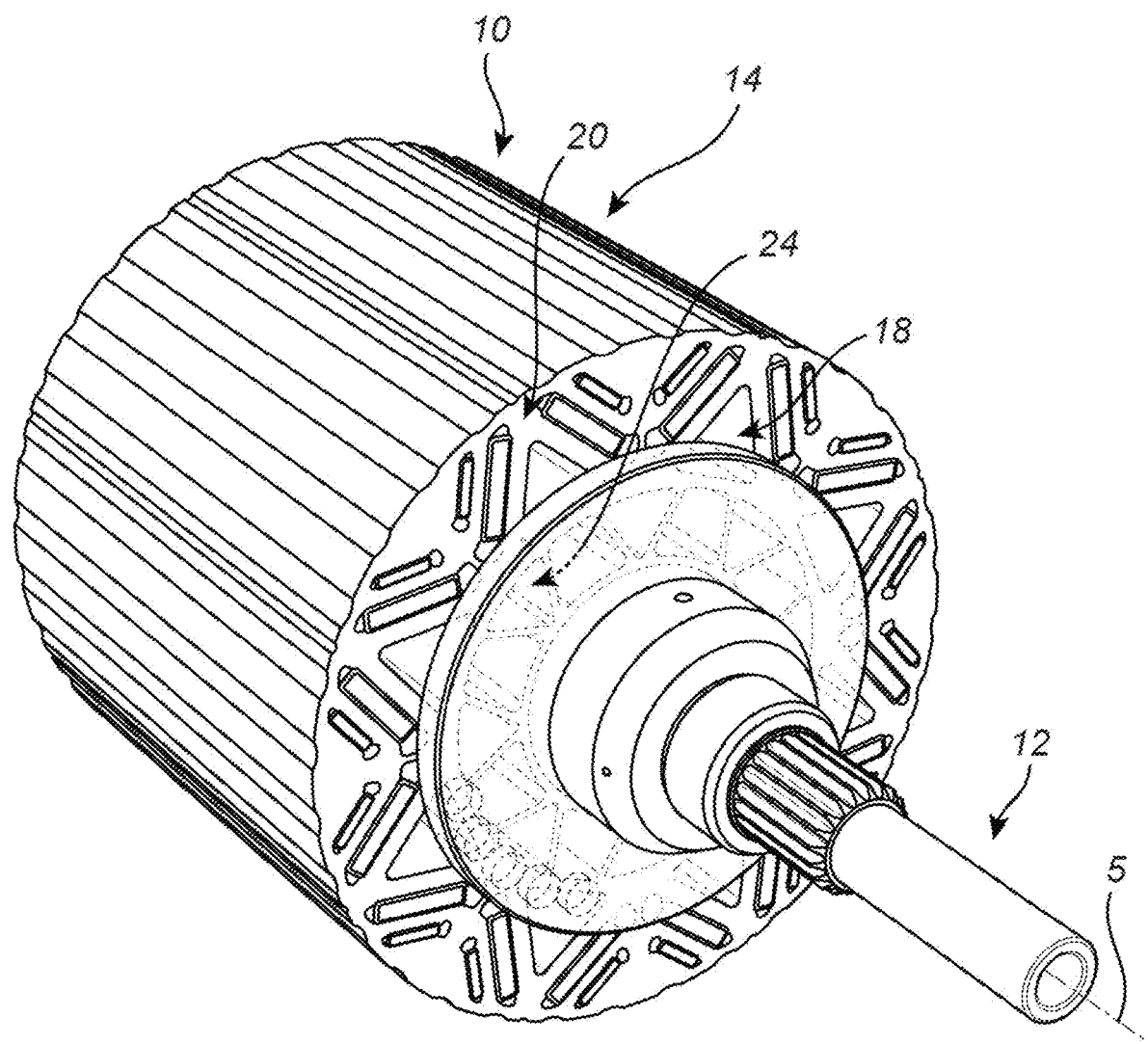
FIG. 4 is another perspective view of one illustrative embodiment of the rotor assembly of the present disclosure, highlighting the associated annulus end ring and rotor shaft and rotor core.

FIG. 4 is another perspective view of the rotor assembly 10 of the present disclosure, highlighting the second end, including the associated annulus end ring 18, rotor shaft 12, rotor core 14, as described in detail herein above and below. In addition, FIG. 4 includes the rotor assembly axis 5, the annulus end ring 18, the magnets 20, and the channels 24.

Figure 5:
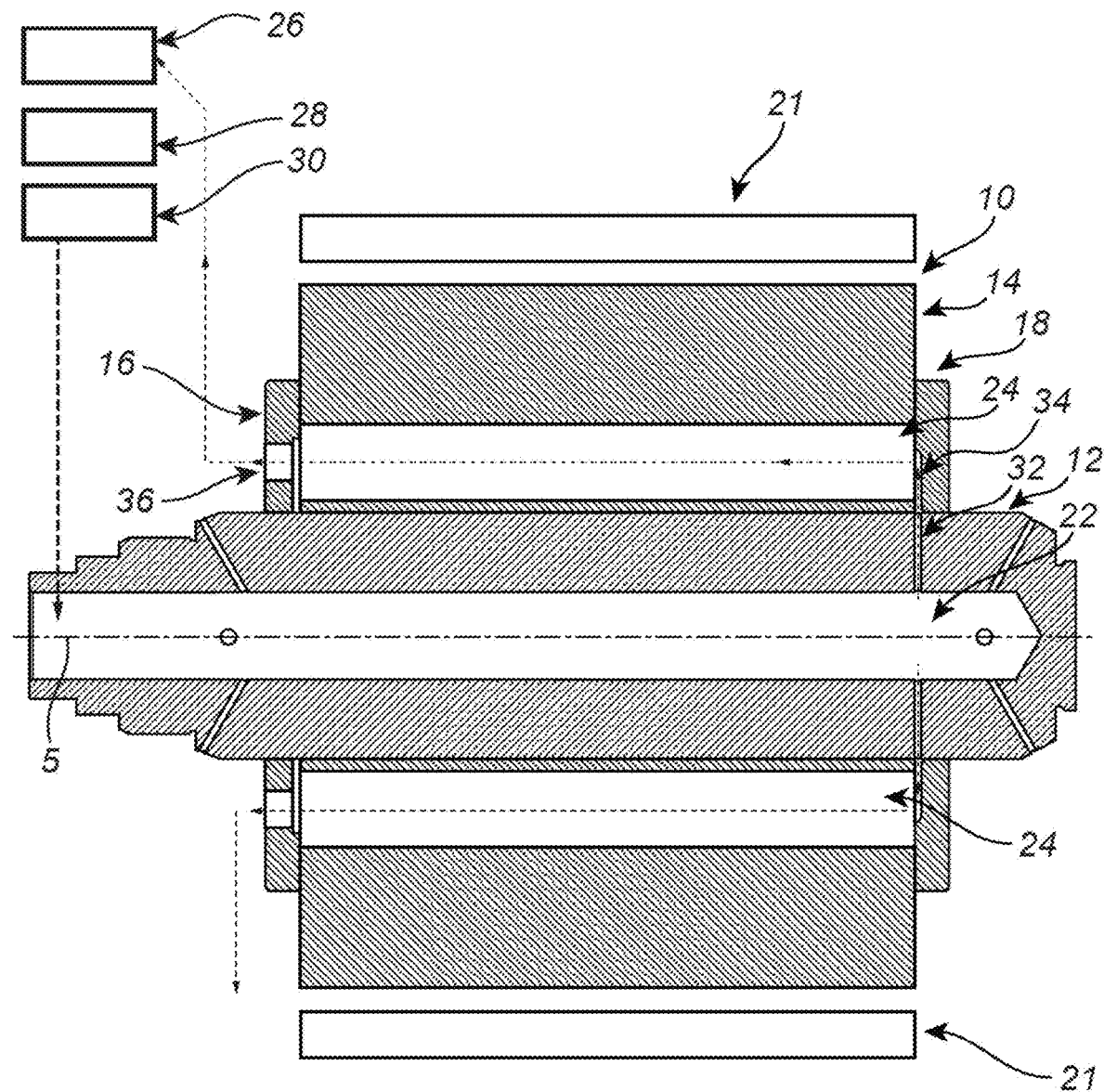
FIG. 5 is a cross-sectional side view of one illustrative embodiment of the rotor assembly of the present disclosure, highlighting the associated outlet end ring, annulus end ring, and interconnected cooling fluid cavity/channels of the associated rotor shaft and rotor core.

Referring now specifically to FIG. 5, the rotor assembly 10 of the present disclosure generally includes the cylindrical rotor shaft 12 concentrically surrounded by the cylindrical rotor core 14. The rotor shaft 12 and rotor core 14 are configured to rotate concentrically about a common rotor assembly axis 5 in unison, potentially at high RPM. The rotor shaft 12 and rotor core 14 are typically both manufactured from steel. The rotor core 14 is capped at a first end by an outlet end ring 16 and at a second end by an annulus end ring 16, both of which consist of annular structures that abut the rotor core 14 but surround the rotor shaft 12.

Again, the rotor core 14 includes a plurality of concentrically (and otherwise) arranged permanent magnets 20 (see FIGS. 1-4) that rotate with the rotor core 14, thereby interacting with the adjacent stator 21. These magnets 20 may have varying sizes. Copper end windings (not illustrated) or the like may also be provided.

The rotor shaft 12 defines the internal cavity 22 that runs at least the length of the rotor core 14 along the rotor assembly axis 5. The rotor core 14 also defines the internal channel 24 that runs the length of the rotor core 14, parallel to the internal cavity 22 of the rotor shaft 12, but disposed radially outwards of the internal cavity 22 of the rotor shaft 12 and the rotor assembly axis 5. Each of these internal cavity/channels 22, 24 is configured to transport a cooling fluid flow, such as an oil flow, through the corresponding component 12, 14. As illustrated, the internal cavity 22 of the rotor shaft 12 is a cylindrical cavity, while the internal channel 24 of the rotor core 14 is a prismatic channel, although any suitable cross-sectional shapes may be utilized, provided that each of the cavity/channels 22, 24 is elongated and substantially traverses the length of the rotor core 14. It should be noted that the internal channel 24 of the rotor core 14 may be any desired radial distance from the rotor assembly axis 5 and the internal cavity 22 of the rotor shaft 12, however the internal channel 24 of the rotor core 14 is generally disposed inside of and/or adjacent to the magnets 20 of the rotor core 14. It should again be noted that, although a singular rotor core internal channel 24 is typically described herein for simplicity, multiple concentrically arranged such rotor core internal channels 24 are preferably utilized and balanced around the periphery of the rotor core 14, all coupled to a single, central rotor shaft internal cavity 22.

In terms of flow direction, the cooling fluid is delivered from a heat exchanger 26, pump 28, and optional filter 30 external to the rotor assembly 10, to the internal cavity 22 of the rotor shaft 12 and internal channel 24 of the rotor core 14 in series. The cooling fluid flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18, and then flows into an inlet end of the internal channel 24 of the rotor core 14 at the second end of the rotor assembly 10 including the annulus end ring 18 and flows parallel to the rotor assembly axis 5 to an outlet end of the internal channel 24 of the rotor core 14 at the first end of the rotor assembly 10 including the outlet end ring 16, before being returned to the heat exchanger 26, pump 28, and filter 30. The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14.

The cooling fluid is transported by centrifugal force, as the rotor assembly 10 spins, from the outlet end of the internal cavity 22 of the rotor shaft 12 to the inlet end of the internal channel 24 of the rotor core 14 by a plurality of radially-oriented passages 32 formed through the wall of the rotor shaft 12, as well as an annulus cavity 34 disposed between the annulus end ring 18 and the second end of the rotor core 14, and specifically the laminate stack of the rotor core 14. This cavity 34 may be formed by a recess manufactured into one or both of the annulus end ring 18 and the second end of the rotor core 14. Thus, a cooling fluid flow path is provided through the internal cavity 22 of the rotor shaft 12, the passages 32, the annulus cavity 34, and the internal channels 24 of the rotor core 14, with the use of both the passages 32 and the cavity 34 being optional. For example, the passages 32 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 34. The passages 32 and the cavity 34 provide a centrifugal force flow path for the cooling fluid as the rotor assembly 10 is spun, in part providing further motive force for forcing the cooling fluid through the rotor shaft 12 and rotor core 14.

Again, the outlet end ring 16 includes a plurality of outlet ports 36 corresponding to the plurality of rotor core internal channels 24 that may or may not serve to partially constrict the cooling fluid flow out of the plurality of rotor core internal channels 24. In the event that such constriction is provided, the cooling fluid is encouraged to coat the surfaces of the plurality of rotor core internal channels 24 and the surface of the rotor shaft internal channel, thereby enhancing cooling capabilities. Once leaving the rotor core internal channels 24, the cooling fluid travels radially outwards to potentially cool the copper end windings or other structures mentioned above and ultimately be returned to the heat exchanger 26, pump 28, and filter 30, before the circuit is repeated after the collected heat has been expelled external to the rotor assembly 10.

Figure 6:
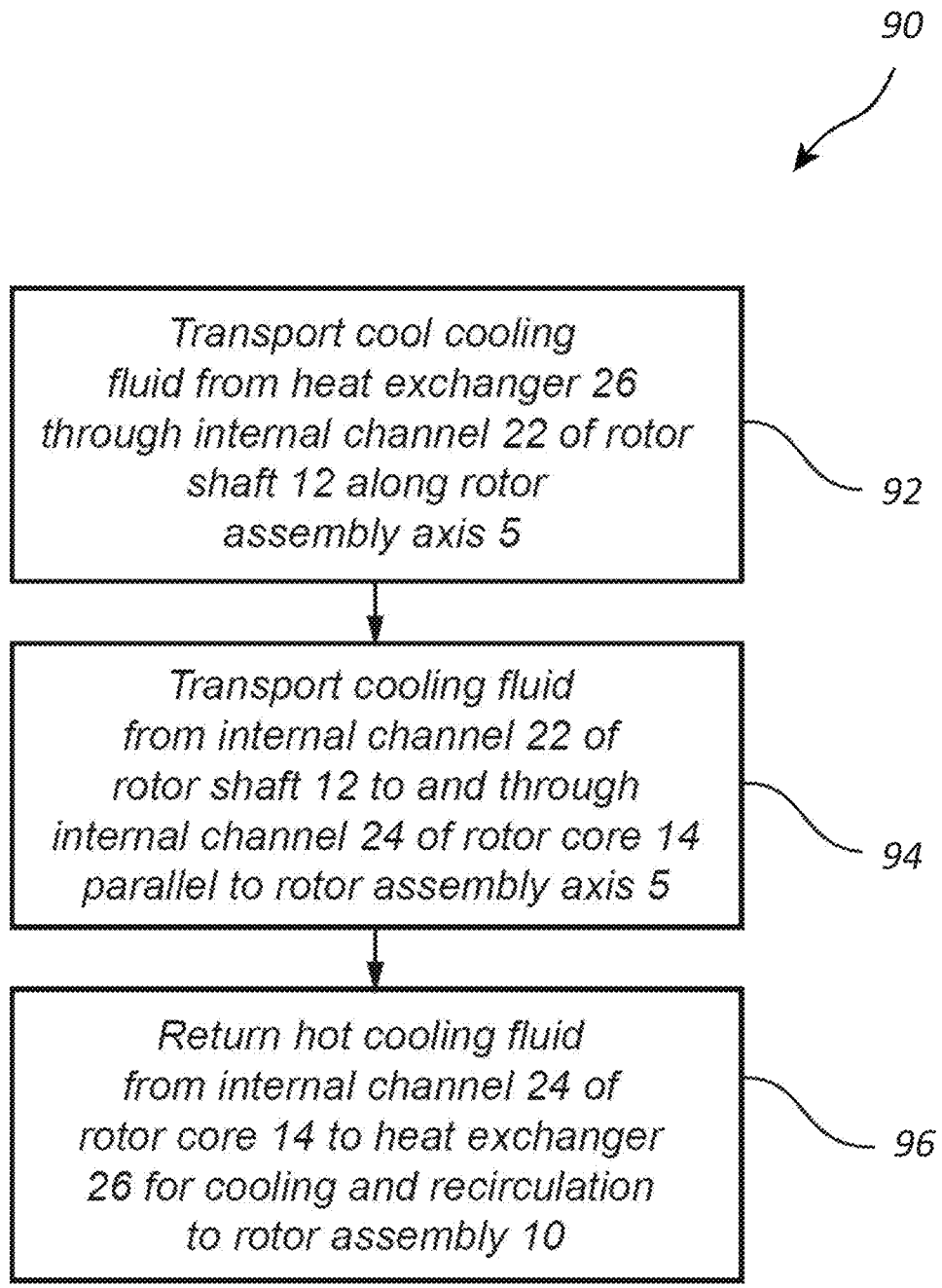
FIG. 6 is a flowchart of one illustrative embodiment of a method for cooling the rotor assembly of the present disclosure via the internal circulation of a cooling fluid through the associated rotor shaft and rotor core.

FIG. 6 illustrates the rotor cooling methodology 90 of the present disclosure, making direct reference to the components of FIGS. 1-5. The cooling fluid is delivered from the heat exchanger 26, pump 28, and optional filter 30 external to the rotor assembly 10, to the internal cavity 22 of the rotor shaft 12 and internal channel 24 of the rotor core 14 in series. The cooling fluid first flows into an inlet end of the internal cavity 22 of the rotor shaft 12 at the first end of the rotor assembly 10 including the outlet end ring 16 and flows along the rotor assembly axis 5 to an outlet end of the internal cavity 22 of the rotor shaft 12 at the second end of the rotor assembly 10 including the annulus end ring 18 (step 92), and then flows into an inlet end of the internal channel 24 of the rotor core 14 at the second end of the rotor assembly 10 including the annulus end ring 18 and flows parallel to the rotor assembly axis 5 to an outlet end of the internal channel 24 of the rotor core 14 at the first end of the rotor assembly 10 including the outlet end ring 16 (step 94), before being returned to the heat exchanger 26, pump 28, and filter 30 (step 96). The cooling fluid is cool entering the rotor assembly 10 and hot leaving the rotor assembly 10, having absorbed unwanted heat from the rotor shaft 12 and rotor core 14. The pump 28, in part, provides motive force for forcing the cooling fluid through the rotor shaft 12 and rotor core 14. The cooling fluid is transported by centrifugal force, as the rotor assembly 10 spins, from the outlet end of the internal cavity 22 of the rotor shaft 12 to the inlet end of the internal channel 24 of the rotor core 14 by a plurality of radially-oriented passages 32 formed through the wall of the rotor shaft 12, as well as a cavity 34 disposed between the annulus end ring 18 and the second end of the rotor core 14, and specifically the laminate stack of the rotor core 14. This cavity 34 may be formed by a recess manufactured into one or both of the annulus end ring 18 and the second end of the rotor core 14. Thus, a cooling fluid flow path is provided through the internal cavity 22 of the rotor shaft 12, the passages 32, the cavity 34, and the internal channels 24 of the rotor core 14, with the use of both the passages 32 and the cavity 34 being optional. For example, the passages 32 may directly couple the internal cavity 22 of the rotor shaft 12 to the internal channels 24 of the rotor core 14, or the internal cavity 22 of the rotor shaft 12 and the internal channels 24 of the rotor core 14 may both directly intersect the cavity 34. The passages 32 and the cavity 34 provide a centrifugal force flow path for the cooling fluid as the rotor assembly 10 is spun, in part providing further motive force for forcing the cooling fluid through the rotor shaft 12 and rotor core 14.

Again, heat extraction from the rotor magnets and lamination core directly impacts machine performance, increasing continuous power and torque output. Such heat extraction allows the motor to spin faster, enabling a wide RPM operating range. The reliability of the EM is increased significantly. Keeping the rotor assembly cooler results in higher power output and longer duration at peak torque, without the system degrading due to thermal limitations. This is advantageous in both automotive and other applications.

The present disclosure also provides a rotor assembly and method for cooling EM end windings and lubricating rotor shaft bearings that makes use of centrifugal force generated by the rotating rotor shaft and rotor core, while minimizing component complexity and packaging volume. Conditioned fluid, such as cool oil, is pumped from a heat exchanger and enters an internal channel formed along a rotor axis of a rotor shaft via a cooling fluid inlet tube, while the rotor shaft and rotor core are rotating. The rotating rotor shaft and rotor core generate centrifugal force that pushes the cool oil through radial passages formed through the rotor shaft wall near the ends of the rotor shaft, on either side of the rotor core in the area of the crown end windings and the weld end windings, adjacent to the outlet end ring and the annulus end ring. Heat generated by the end windings due to ohmic losses is absorbed by the cool oil as the oil is sprayed onto the full internal circumference of the end windings, and the oil heats up. Hot oil drains back to an oil sump of the assembly to be recirculated back to the heat exchanger to be cooled again, as well as a pump and optional filter. By utilizing passages perpendicular to the rotor axis, the end windings are primarily cooled by the cool oil. By utilizing angled passages, the bearings in the vicinity are also lubricated, in addition to the end windings being cooled by the cool oil. The passages at either end of the rotor shaft can have different cross-sectional diameters, such that a desired oil flow balance is maintained between the two ends of the rotor shaft and rotor core and the end windings and bearings.

The utilization of an inlet oil tube and calibrated metering holes (also referred to as paths or passages herein) is intended to control and balance the oil flow distribution. Thus, oil distribution may or may not be independent of rotor speed (i.e., centrifugal loading). The oil is jetted outwards as the rotor shaft spins to provide full 360-degree coverage of the internal diameters of the end windings. This ensures complete winding wetting and prevents hot spots. In addition, this method provides effective cooling and lubrication of the roller bearings. The result is more effective heat extraction at the end windings and bearings, improved motor continuous torque ratings, higher motor torque and power outputs, enhanced reliability of an EM, including end winding enamel, varnish, and dielectric insulation, improved lubrication of the bearing system, and optimized packaging with reduced components. The need for external stator cooling channels is eliminated. This is true in both automotive (e.g., car, truck, sport utility vehicle, van, delivery vehicle, and adventure vehicle) and non-automotive applications, both of which are contemplated herein.

Figure 7:
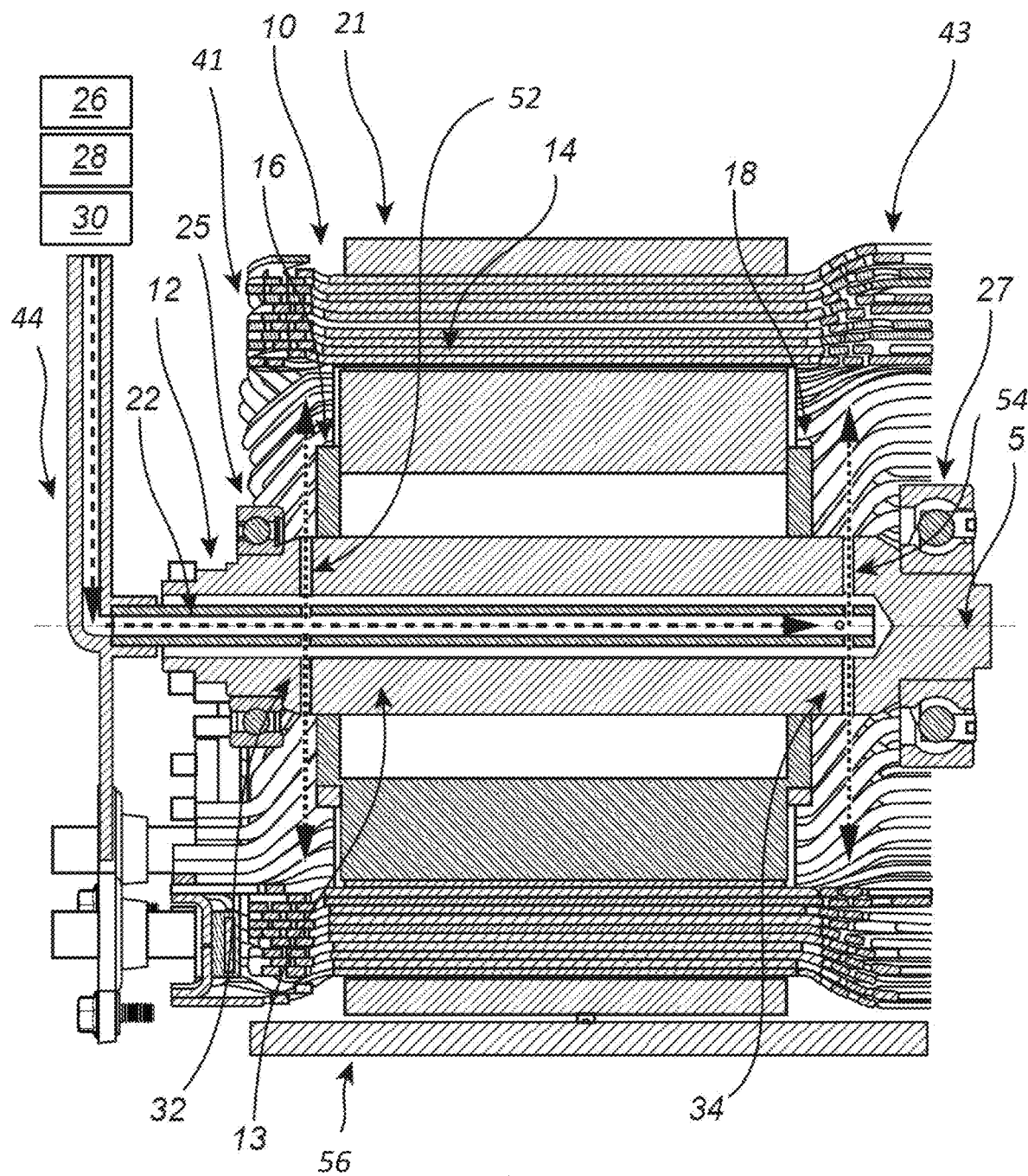
FIG. 7 is a planar side view of another exemplary embodiment of the rotor/stator assembly of the present disclosure, highlighting the associated internal channel and flow passages of the rotor shaft that distribute cooling fluid to the end windings.

Referring now specifically to FIG. 7, in another illustrative embodiment, the rotor/stator assembly 10 of the present disclosure generally includes a cylindrical rotor shaft 12 concentrically surrounded by a cylindrical rotor core 14, possibly such as those described above for FIGS. 1-6. As used herein, "cylindrical" and "annular" again refer to structures having a generally circular internal cross-sectional shape, and a likely a roughly circular external cross-sectional shape, although this external cross-sectional shape may vary to some degree, having flat or irregular regions. The rotor shaft 12 and rotor core 14 are configured to rotate concentrically about a common rotor axis 5 in unison, potentially at high revolutions-per-minute (RPM). The rotor shaft 12 and rotor core 14 are typically both manufactured from steel. Yet, the rotor shaft 12 and rotor core 14 may be manufactured from any metal or metal alloy, such as iron, a combination of such metals, among other possibilities. The rotor core 14 is capped at a first end by an outlet end ring 16 and at a second end by an annulus end ring 18, both of which consist of annular structures that abut the rotor core 14 but surround the rotor shaft 12.

The rotor core 14 includes a plurality of concentrically (and otherwise) arranged permanent magnets 20 (FIGS. 1-4) fitted into slots within the rotor core 14 so that the magnets rotate with the rotor core 14, thereby interacting with the adjacent laminate stack of the stator 21 that is disposed concentrically about the rotor core 14, as in one or more such EMs described herein. These magnets may have varying sizes to fit within the slots of the rotor core 14 to reduce back electromagnetic forces and drive torque with reluctance effects. End windings 41, 43 of the stator 21, made of copper or another suitable metal or material, may protrude axially beyond the rotor core 14 and concentrically surround it, consisting of crown end windings 41 adjacent to the first end of the rotor shaft 12 and rotor core 14 and weld end windings 43 adjacent to the second end of the rotor shaft 12 and rotor core 14. The first end of the rotor shaft 12 appears adjacent to the crown end windings 41 and/or the inlet tube 44 described below. The second end of the rotor shaft 12 appears adjacent to the weld end windings 43. These end windings 41, 43 may reach high temperatures due to lamination core losses and ohmic heating as current flows through the end windings 41, 43 such that the temperatures may degrade the performance of the assembly 10, and the performance of the EM at various speeds, and must be cooled effectively. Further, the rotor shaft 12 is rotated/rotating via a first bearing assembly 25 disposed at the first end of the rotor shaft 12 and a second bearing assembly disposed at the second end of the rotor shaft. These bearings 25, 27 may also reach high temperatures that may degrade their performance, and must be cooled and lubricated effectively.

Per the present disclosure, the rotor shaft 12 defines an internal cavity (or channel) 22 that runs at least a portion of the length of the rotor core 14 along the rotor axis 5, and may run the full length of the rotor core 14 or more. This internal cavity 22 is adapted to deliver a cooling fluid flow, such as a cool oil flow, from a cooling fluid inlet tube 44, a heat exchanger 26, a pump 28, and an optional filter 30 through the rotor shaft 12. As illustrated, the internal cavity 22 of the rotor shaft 12 is a cylindrical channel or conduit, although any suitable cross-sectional shape may be utilized, provided that the cavity 22 is elongated and substantially traverses the length of the rotor core 14.

The rotor shaft 12 defines a first series of concentrically-arranged, radially-aligned passages 52 passing through a wall 13 of the rotor shaft 12 at the first end thereof, thereby forming a first series of paths by which the cooling fluid passes by pumping (e.g., with pump 28) and centrifugal force from the internal cavity 22 of the rotor shaft 12 to the first end of the rotor core 14 adjacent to the outlet end ring 16 when the rotor shaft 12 and rotor core 14 are rotated/rotating. The rotor shaft 12 also defines (in combination or in the alternative) a second series of concentrically-arranged, radially-aligned passages 54 passing through the wall 13 of the rotor shaft 12 at the second end thereof, thereby forming a second series of paths by which the cooling fluid passes by pumping (e.g., with pump 28) and centrifugal force from the internal cavity 22 of the rotor shaft 12 to the second end of the rotor core 14 adjacent to the annulus end ring 18 when the rotor shaft 12 and rotor core 14 are rotated/rotating. In this illustrative embodiment, the passages 52, 54 are aligned perpendicular to the rotor shaft 12 and/or rotor axis 5 such that the cooling fluid passes from the internal cavity 22 of the rotor shaft 12 to one or more of the crown end windings 41 and the weld end windings 43 when the rotor shaft 12 and rotor core 14 are rotated/rotating, thereby cooling their entire internal diameter of the rotor shaft 12 and the rotor core 14 at this point.

After this cooling is accomplished, the now hot cooling fluid is collected in the cooling fluid sump 56 before being eventually recirculated to the heat exchanger 26, pump 28, and filter 30.

Figure 8:
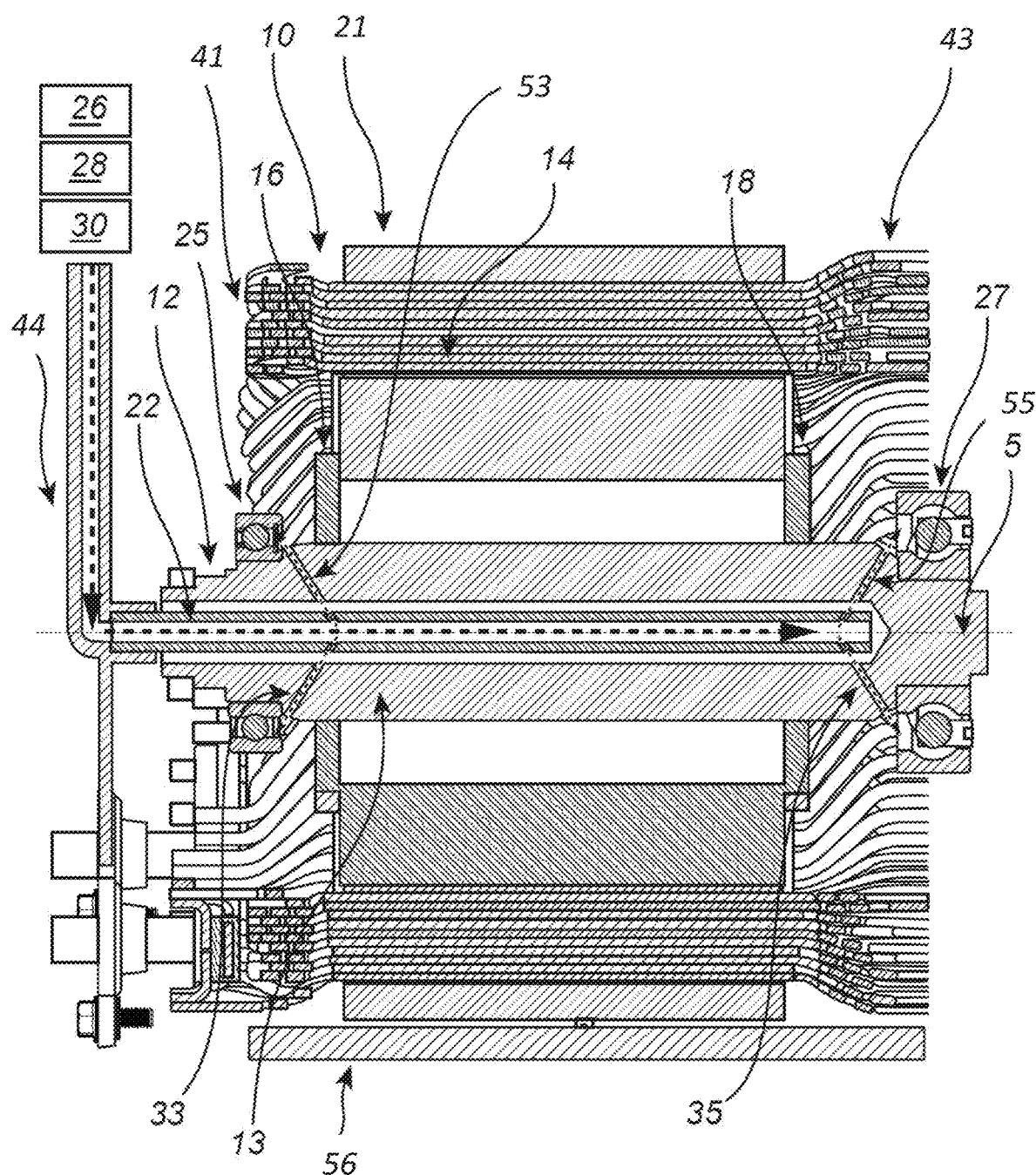
FIG. 8 is a planar side view of another exemplary embodiment of the rotor/stator assembly of the present disclosure, highlighting the associated internal channel and flow passages of the rotor shaft that distribute cooling and lubricating fluid to the end windings and bearings.

Referring now specifically to FIG. 8, in another illustrative embodiment, the rotor/stator assembly 10 of the present disclosure again generally includes a cylindrical rotor shaft 12 concentrically surrounded by a cylindrical rotor core 14. The rotor shaft 12 and rotor core 14 are configured to rotate concentrically about a common rotor axis 5 in unison, potentially at high RPM. The rotor shaft 12 and rotor core 14 are typically both manufactured from steel. Yet, the rotor shaft 12 and rotor core 14 may be manufactured from any metal or metal alloy, such as iron, among other possibilities. The rotor core 14 is capped at a first end by an outlet end ring 16 and at a second end by an annulus end ring 18, both of which consist of annular structures that abut the rotor core 14 but surround the rotor shaft 12.

The rotor core 14 includes a plurality of concentrically (and otherwise) arranged permanent magnets 20 (FIGS. 1-4) fitted into slots within the rotor core 14 so that the magnets rotate with the rotor core 14, thereby interacting with the adjacent laminate stack of the stator 21 that is disposed concentrically about the rotor core 14, as in one or more such EMs described herein. These magnets may have varying sizes to fit within the slots of the rotor core 14 to reduce back electromagnetic forces and drive torque with reluctance effects. End windings 41, 43 of the stator 21, made of copper or another suitable metal or material, may protrude axially beyond the rotor core 14 and concentrically surround it, consisting of crown end windings 41 adjacent to the first end of the rotor shaft 12 and rotor core 14 and weld end windings 43 adjacent to the second end of the rotor shaft 12 and rotor core 14. The first end of the rotor shaft 12 appears adjacent to the crown end windings 41 and/or the inlet tube 44 described below. The second end of the rotor shaft 12 appears adjacent to the weld end windings 43. These end windings 41, 43 may reach high temperatures due to lamination core losses and ohmic heating as current flows through the end windings 41, 43 such that the temperatures may degrade the performance of the assembly 10, and the performance of the EM at various speeds, and must be cooled effectively. Further, the rotor shaft 12 is rotated/rotating via a first bearing assembly 25 disposed at the first end of the rotor shaft 12 and a second bearing assembly disposed at the second end of the rotor shaft. These bearings 25, 27 may also reach high temperatures that may degrade their performance, and must be cooled and lubricated effectively.

Per the present disclosure, the rotor shaft 12 defines an internal cavity (or channel) 22 that runs at least a portion of the length of the rotor core 14 along the rotor axis 5, and may run the full length of the rotor core 14 or more. This internal cavity 22 is adapted to deliver a cooling fluid flow, such as a cool oil flow, from a cooling fluid inlet tube 44, a heat exchanger 26, a pump 28, and an optional filter 30 through the rotor shaft 12. As illustrated, the internal cavity 22 of the rotor shaft 12 is a cylindrical channel, although any suitable cross-sectional shape may be utilized, provided that the cavity 22 is elongated and substantially traverses the length of the rotor core 14.

The rotor shaft 12 again defines a first series of concentrically-arranged, radially-aligned passages 53 passing through a wall 13 of the rotor shaft 12 at the first end thereof, thereby forming a first series of paths by which the cooling fluid passes by pumping (e.g., with pump 28) and centrifugal force from the internal cavity 22 of the rotor shaft 12 to the first end of the rotor core 14 adjacent to the outlet end ring 16 when the rotor shaft 12 and rotor core 14 are rotated/rotating. The rotor shaft 12 also defines (in combination or in the alternative) a second series of concentrically-arranged, radially-aligned passages 55 passing through the wall 13 of the rotor shaft 12 at the second end thereof, thereby forming a second series of paths by which the cooling fluid passes by pumping (e.g., with pump 28) and centrifugal force from the internal cavity 22 of the rotor shaft 12 to the second end of the rotor core 14 adjacent to the annulus end ring 18 when the rotor shaft 12 and rotor core 14 are rotated/rotating. In this illustrative embodiment, the passages 53, 55 are aligned non-perpendicular to the rotor axis 5 such that the cooling fluid passes from the internal cavity 22 of the rotor shaft 12 to one or more of the crown end windings 41 and the weld end windings 43, as well as to lubricate the bearing assemblies 25, 27, when the rotor shaft 12 and rotor core 14 are rotated/rotating, thereby still cooling their entire internal diameter at this point. Preferably, the passages 53, 55 here are angled to more precisely direct the lubricating cooling fluid flow to the bearing assemblies 25, 27. Such angled passages 53, 55 can be used in place of or in combination with the perpendicular passages 52, 54 of FIG. 7, such as in a concentrically-alternating configuration or the like.

After this cooling and lubricating is accomplished, the now hot cooling fluid is again collected in the cooling fluid sump 56 before being eventually recirculated to the heat exchanger 26, pump 28, and filter 30.

In either or both of the illustrative embodiments of FIG. 7 and FIG. 8, the first passages 52, 53 may have a relatively smaller cross-sectional diameter than a relatively larger cross-sectional diameter of the second passages 54, 55, thereby balancing cooling fluid flow through the first passages 52, 53 and the second passages 54, 55 and thus cooling of the crown end windings 41 and the weld end windings 43 and lubrication of the first bearing assembly 25 and the second bearing assembly 27. For example, the first passages 52, 32, 53, 33 may have a smaller cross-sectional diameter than second passages 54, 34, 55, 35, such that some fluid from the inlet tube 44 entering the internal cavity 22 passes to the first passages 52, 32, 53, 33. Further, based on the smaller cross-sectional diameters of the first passages 52, 32, 53, 33 additional fluid from the inlet tube 44 continues passing in the internal cavity 22 past the first passages 52, 32, 53, 33 and further to the second passages 54, 34, 55, 35. More fluid constriction is provided at the first end of the rotor assembly 10, where the pump pressure is higher, than at the second end of the rotor assembly 10 via this cross-sectional diameter difference.

Figure 9:
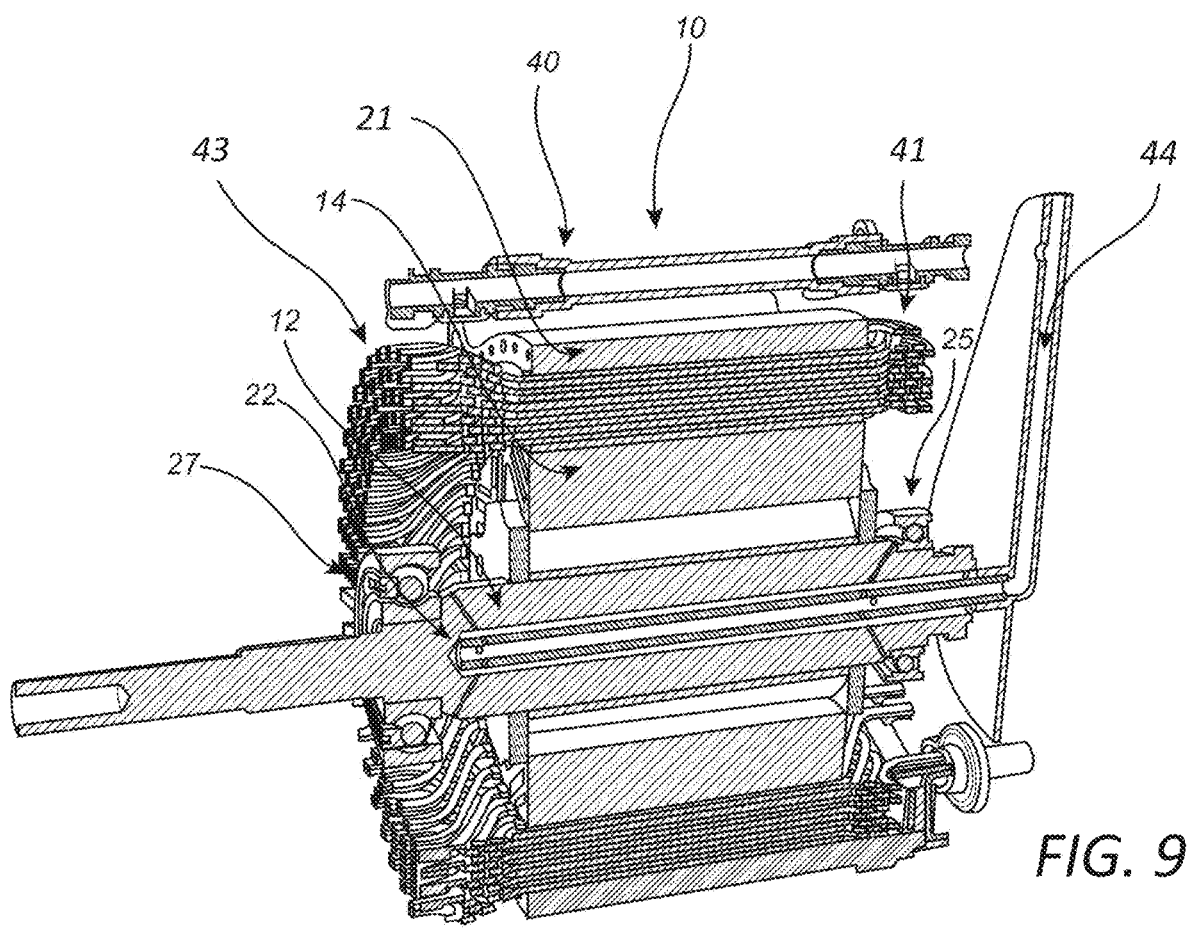
FIG. 9 is a partial perspective view of the rotor/stator assembly of FIG. 8.

FIG. 9 is a partial perspective view of the rotor/stator assembly 10 of FIG. 8, in which the rotor shaft 12, rotor core 14, stator 21, internal cavity 22, inlet tube 44, end windings 41, 43, and bearing assemblies 25, 27 can be seen. Here, a cooling fluid spray baffle 40 typically used to cooling the end windings 41, 43 can also be seen, however, the internal cooling system of the present disclosure provides superior cooling (and lubrication) performance.

Figure 10:
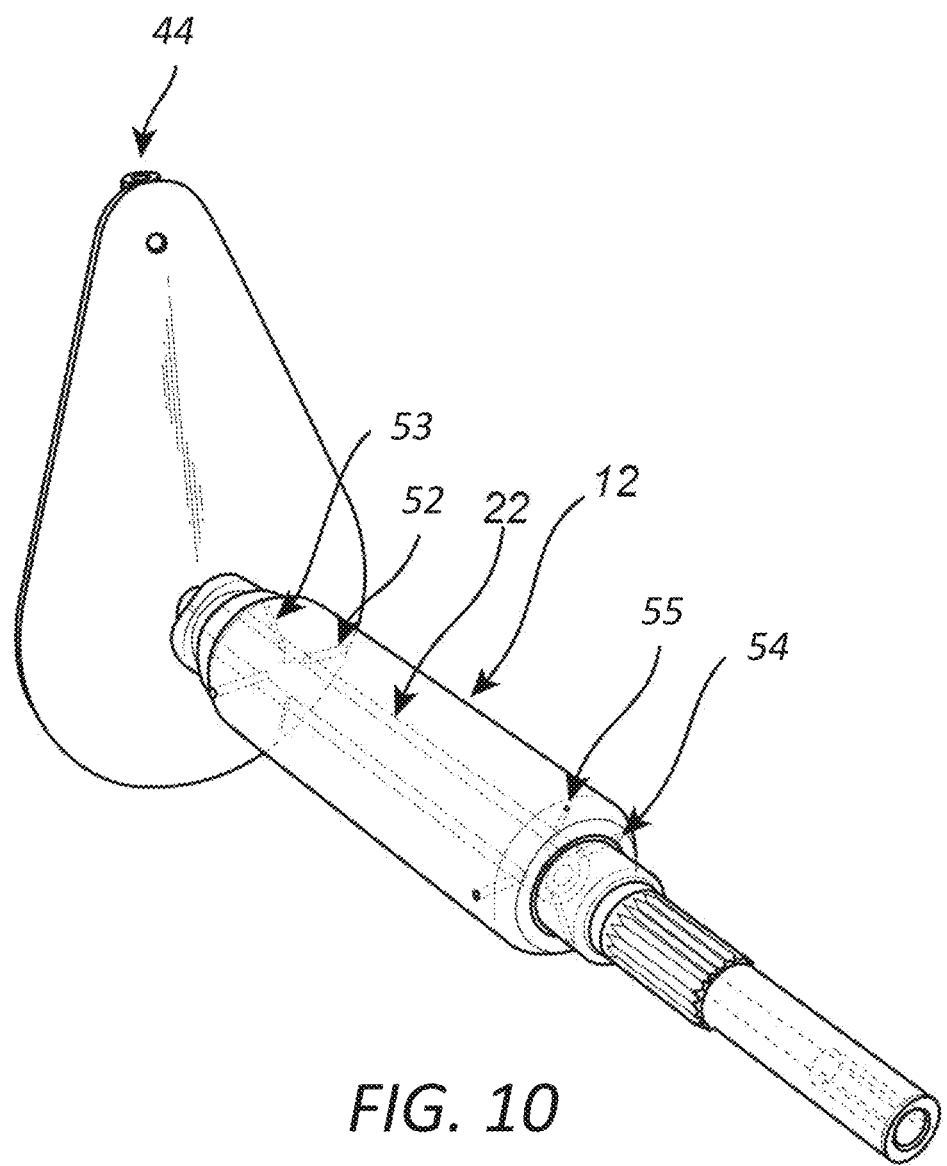
FIG. 10 is a perspective view of the rotor shaft and cooling fluid inlet tube of the rotor/stator assembly of FIGS. 7 and 8, highlighting the associated internal channel of the rotor shaft, flow passages that distribute cooling fluid to the end windings, and flow passages that distribute cooling and lubricating fluid to the end windings and bearings, when used in combination.

FIG. 10 is a perspective view of the rotor shaft 12 and cooling fluid inlet tube 44 of the rotor/stator assembly 10 of FIGS. 7 and 8, highlighting the associated internal cavity 22 of the rotor shaft 12, flow passages 52, 54 that distribute cooling fluid to the end windings 41, 43, and flow passages 53, 55 that distribute cooling and lubricating fluid to the end windings 41, 43 and bearings 25, 27, as described above. Notably, when used in combination, passages 52, 54 may distribute the cooling fluid to the end windings 41, 43, respectively. Yet, passages 53, 55 may distribute the cooling fluid to the end windings 41, 43, respectively, and may also distribute the cooling fluid to the bearings 25, 27. As illustrated, around the circumference of the rotor shaft 12, the perpendicular passages 52, 54 cooling the end windings 41, 43 are disposed at 0 and 180 degrees, while the angled passages 53, 55 cooling the end windings 41, 43 and lubricating the bearings 25, 27 are disposed at 90 and 270 degrees, although different arrangements and periodicities are of course possible.

Figure 11:
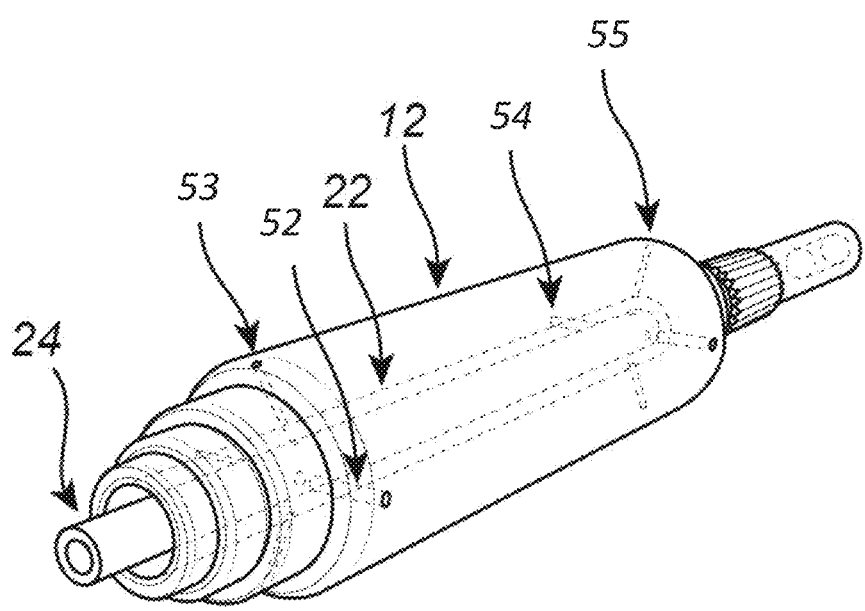
FIG. 11 is a perspective view of the rotor shaft of the rotor/stator assembly of FIGS. 7 and 8, again highlighting the associated internal channel of the rotor shaft, flow passages that distribute cooling fluid to the end windings, and flow passages that distribute cooling and lubricating fluid to the end windings and bearings, when used in combination.

FIG. 11 is a perspective view of the rotor shaft 12 of the rotor/stator assembly 10 of FIGS. 7 and 8, again highlighting the associated internal cavity 22 of the rotor shaft 12, flow passages 52, 54 that distribute cooling fluid to the end windings 41, 43, and flow passages 53, 55 that distribute cooling and lubricating fluid to the end windings 41, 43 described above and bearings 25, 27, when used in combination. Again, as illustrated, around the circumference of the rotor shaft 12, the perpendicular passages 52, 54 cooling the end windings 41, 43 are disposed at 0 and 180 degrees, while the angled passages 53, 55 cooling the end windings 41, 43 and lubricating the bearings 25, 27 are disposed at 90 and 270 degrees, although different arrangements and periodicities are of course possible. For example, the outlet of the internal cavity 22 coupled to the inlet of the internal channel 24 as described in FIGS. 1-6 may be implemented with the first passages 52, 32, 53, 33 and/or the second passages 54, 34, 55, 35 as described in FIG. 7-12.

Figure 12:
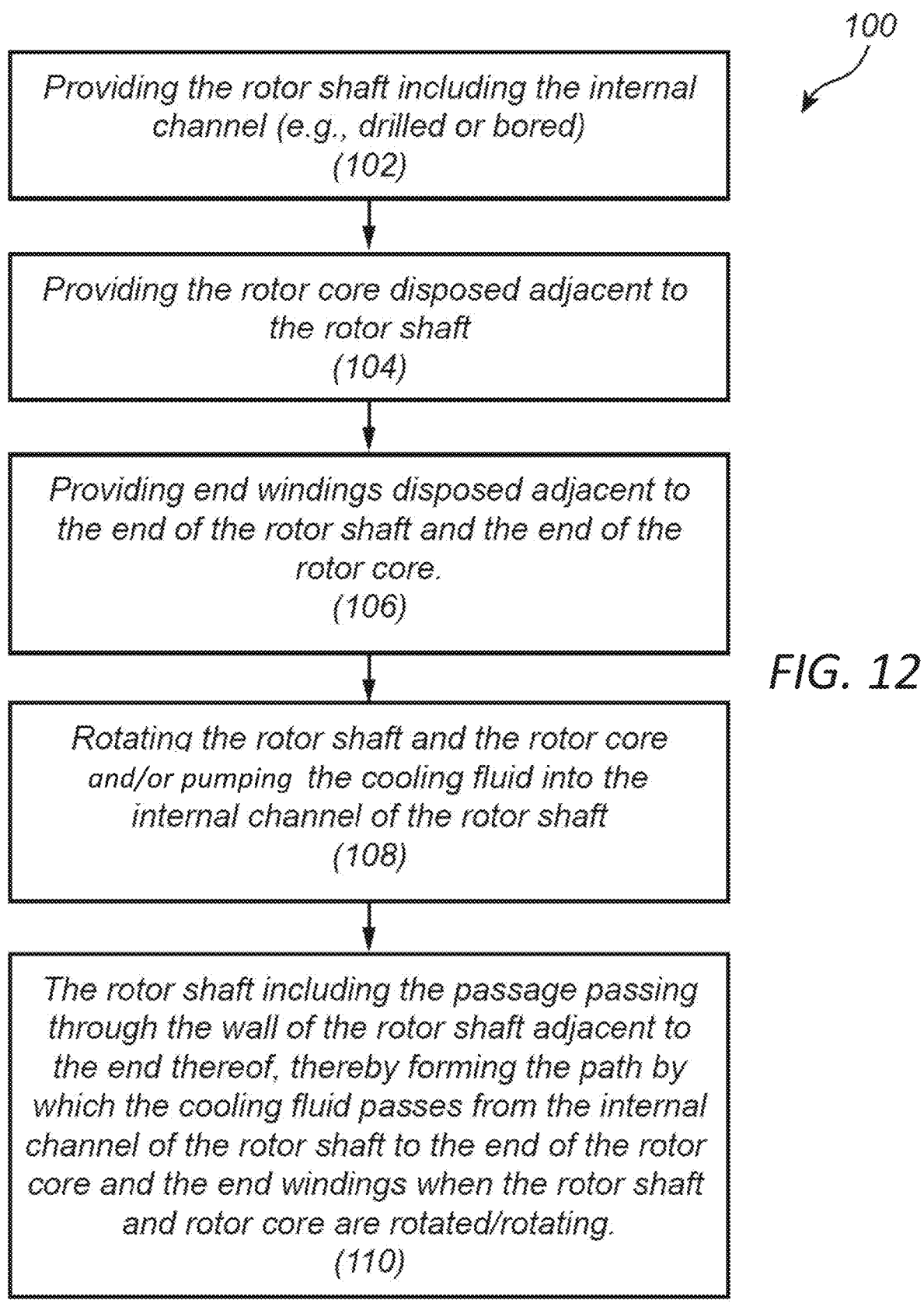
FIG. 12 is a flowchart of one exemplary embodiment of the rotor/stator operation method of the present disclosure, highlighting the functionality of the associated internal channel and flow passages of the rotor shaft that distribute cooling fluid to the end windings when the rotor shaft and rotor core are rotated, by centrifugal and/or pumping force.

FIG. 12 further provides a method 100 for cooling a rotor/stator assembly 10 for a motor, including: providing a cylindrical rotor shaft 12 including, encompassing, forming, and/or defining an internal cavity 22 disposed along a rotor axis 5 (step 102); providing a cylindrical rotor core 14 disposed concentrically about the cylindrical rotor shaft 12 (step 104); providing a plurality of crown end windings 41 disposed concentrically about a first end of the rotor shaft 12 and the rotor core 14 (step 106); providing a plurality of weld end windings 43 disposed concentrically about a second end of the rotor shaft 12 and the rotor core 14 (step 106); circulating a cooling fluid from the internal cavity 22 of the rotor shaft 12 to the first end of the rotor core 14 by rotating the rotor shaft 12 and the rotor core 14 (step 108), whereby centrifugal force is created when the rotor shaft 12 and rotor core 14 are rotated/rotating, via a first passage 52, 53 defined through a wall of the rotor shaft 12 at the first end thereof (step 110); and circulating the cooling fluid from the internal cavity 22 of the rotor shaft 12 to the second end of the rotor core 14 by centrifugal force when the rotor shaft 12 and rotor core 14 are rotated/rotating via a second passage 54, 55 defined through the wall of the rotor shaft 12 at the second end thereof (step 110). Optionally, one or more of the first passage 52 and the second passage 54 are aligned perpendicular to the rotor shaft 12 and/or the rotor axis 5 such that the cooling fluid passes from the internal cavity 22 of the rotor shaft 12 to one or more of the crown end windings 41 and the weld end windings 43 when the rotor shaft 12 and rotor core 14 are rotated/rotating. Alternatively, one or more of the first passage 53 and the second passage 55 are aligned non-perpendicular to the rotor shaft 12 and/or the rotor axis 5 such that the cooling fluid passes from the internal cavity 22 of the rotor shaft 12 to one or more of the crown end windings 41 and the weld end windings 43 when the rotor shaft 12 and rotor core 14 are rotated/rotating, as well as one or more of a first bearing 25 disposed adjacent to the first end of the rotor core 14 and a second bearing 27 disposed adjacent to the second end of the rotor core 14 for cooling and lubrication. The rotor shaft 12 defines a plurality of radially-arranged first passages 52, 53 passing through the wall of the rotor shaft 12 at the first end thereof. The rotor shaft 12 also defines a plurality of radially-arranged second passages 54, 55 passing through the wall of the rotor shaft 12 at the second end thereof. The first passage(s) 52, 53 has/have a relatively smaller cross-sectional diameter than a relatively larger cross-sectional diameter of the second passage(s) 54, 55, thereby balancing cooling fluid flow through the first passage(s) 52, 53 and the second passage(s) 54, 55.

Again, the utilization of an inlet oil tube and calibrated metering holes, paths, or passages is intended to control and balance the oil flow distribution. Thus, oil distribution may or may not be independent of rotor speed (i.e., centrifugal loading). The oil is jetted outwards as the rotor shaft spins to provide full 360-degree coverage of the internal diameters of the end windings. This ensures complete winding wetting and prevents hot spots. In addition, this method provides effective cooling and lubrication of the roller bearings. The result is effective heat extraction at the end windings and bearings, improve motor continuous torque ratings, high motor torque and power outputs, reliability of an EM, including end winding enamel, varnish, and dielectric insulation, improved lubrication of the bearing system, and optimized packaging with reduced components. The need for external stator cooling channels is eliminated. This is true in both automotive (e.g., car, truck, sport utility vehicle, van, delivery vehicle, and adventure vehicle) and non-automotive applications, both of which are contemplated herein.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A rotor assembly for a permanent magnet motor, comprising:
   a rotor shaft comprising an internal cavity having an outlet; and
   a rotor core disposed about the rotor shaft comprising an internal channel having an inlet;
   wherein the outlet of the internal cavity of the rotor shaft is coupled to the inlet of the internal channel of the rotor core;
   wherein the internal cavity of the rotor shaft and the internal channel of the rotor core are configured to circulate a cooling fluid through the rotor shaft and the rotor core; and
   wherein an outlet of the internal channel of the rotor core is formed through an outlet port of an outlet end ring coupled to a first end of the rotor core adjacent to the rotor shaft, wherein the outlet port of the outlet end ring directs the cooling fluid through the outlet end ring outside of the rotor shaft and parallel to a rotor axis.

2. The rotor assembly of claim 1, wherein the outlet of the internal cavity of the rotor shaft is coupled to the inlet of the internal channel of the rotor core via a fluid flow passage formed through a wall of the rotor shaft, and wherein centrifugal forces from the rotor shaft and the rotor core move the cooling fluid through the fluid flow passage from the internal cavity of the rotor shaft to the internal channel of the rotor core.

3. The rotor assembly of claim 1, wherein the outlet of the internal cavity of the rotor shaft is coupled to the inlet of the internal channel of the rotor core via an annulus end cavity formed by an annulus end ring coupled to a second end of the rotor core adjacent to the rotor shaft.

4. The rotor assembly of claim 1, wherein the outlet of the internal channel of the rotor core is coupled to an inlet of the internal cavity of the rotor shaft through an intervening pump, heat exchanger, and filter.

5. The rotor assembly of claim 1, wherein the rotor core comprises a plurality of concentrically arranged permanent magnets adapted to interact with a stator assembly disposed about the rotor core.

6. The rotor assembly of claim 1, wherein the rotor shaft comprises a cylindrical rotor shaft and the internal cavity is disposed along the rotor axis of the cylindrical rotor shaft, and wherein the rotor core comprises a cylindrical rotor core disposed concentrically about the cylindrical rotor shaft, and the internal channel is disposed parallel to the rotor axis of the cylindrical rotor shaft.

7. A permanent magnet motor of a vehicle, comprising:
   a rotor assembly, comprising:
      a rotor shaft comprising an internal cavity having an outlet; and
      a rotor core disposed about the rotor shaft comprising an internal channel having an inlet;
      wherein the outlet of the internal cavity of the rotor shaft is coupled to the inlet of the internal channel of the rotor core;
      wherein the internal cavity of the rotor shaft and the internal channel of the rotor core are configured to circulate a cooling fluid through the rotor shaft and the rotor core; and
      wherein an outlet of the internal channel of the rotor core is formed through an outlet port of an outlet end ring coupled to a first end of the rotor core adjacent to the rotor shaft, wherein the outlet port of the outlet end ring directs the cooling fluid through the outlet end ring outside of the rotor shaft and parallel to a rotor axis; and
   a stator assembly disposed about the rotor assembly.

8. The permanent magnet motor of claim 7, wherein the outlet of the internal cavity of the rotor shaft is coupled to the inlet of the internal channel of the rotor core via a fluid flow passage formed through a wall of the rotor shaft, and wherein centrifugal forces from the rotor shaft and the rotor core move the cooling fluid through the fluid flow passage from the internal cavity of the rotor shaft to the internal channel of the rotor core.

9. The permanent magnet motor of claim 7, wherein the outlet of the internal cavity of the rotor shaft is coupled to the inlet of the internal channel of the rotor core via an annulus end cavity formed by an annulus end ring coupled to a second end of the rotor core adjacent to the rotor shaft.

10. The permanent magnet motor of claim 7, wherein the outlet of the internal channel of the rotor core is coupled to an inlet of the internal cavity of the rotor shaft through an intervening pump, heat exchanger, and filter.

11. The permanent magnet motor of claim 7, wherein the rotor core comprises a plurality of concentrically arranged permanent magnets adapted to interact with the stator assembly.

12. The permanent magnet motor of claim 7, wherein the rotor shaft comprises a cylindrical rotor shaft and the internal cavity is disposed along the rotor axis of the cylindrical rotor shaft, and wherein the rotor core comprises a cylindrical rotor core disposed concentrically about the cylindrical rotor shaft, and the internal channel is disposed parallel to the rotor axis of the cylindrical rotor shaft.

13. A method for cooling an interior of a rotor assembly for a permanent magnet motor, comprising:
   circulating a cooling fluid through a rotor shaft comprising an internal cavity having an outlet; and
   circulating the cooling fluid through a rotor core disposed about the rotor shaft, comprising an internal channel having an inlet;
   wherein the outlet of the internal cavity of the rotor shaft is coupled to the inlet of the internal channel of the rotor core;
   wherein the internal cavity of the rotor shaft and the internal channel of the rotor core are configured to circulate the cooling fluid through the rotor shaft and the rotor core; and
   wherein an outlet of the internal channel of the rotor core is formed through an outlet port of an outlet end ring coupled to a first end of the rotor core adjacent to the rotor shaft, wherein the outlet port of the outlet end ring directs the cooling fluid through the outlet end ring outside of the rotor shaft and parallel to a rotor axis.

14. The method of claim 13, wherein the outlet of the internal cavity of the rotor shaft is coupled to the inlet of the internal channel of the rotor core via a fluid flow passage formed through a wall of the rotor shaft, and wherein centrifugal forces from the rotor shaft and the rotor core are used move the cooling fluid through the fluid flow passage from the internal cavity of the rotor shaft to the internal channel of the rotor core.

15. The method of claim 13, wherein the outlet of the internal cavity of the rotor shaft is coupled to the inlet of the internal channel of the rotor core via an annulus end cavity formed by an annulus end ring coupled to a second end of the rotor core adjacent to the rotor shaft.

16. The method of claim 13, wherein the outlet of the internal channel of the rotor core is coupled to an inlet of the internal channel of the rotor shaft through an intervening pump, heat exchanger, and filter and the method further comprises removing heat from the cooling fluid using the heat exchanger.

17. The method of claim 13, further comprising drilling the internal cavity through the rotor shaft and drilling the internal channel through the rotor core.

* * * * *